(12) United States Patent
Byun (10) Patent No.: US 9,088,039 B2
(45) Date of Patent: Jul. 21, 2015

(54) RECHARGEABLE BATTERY MODULE (75) Inventor: Sang-Won Byun, Suwon-si (KR)

(73) Assignees: SAMSUNG SDI CO., LTD., Yongin-si, Gyeonggi-Do (KR); ROBERT BOSCH GmbH, Stuttgart (DE)

( * ) Notice: Subject to any disclaimer, the term of this patent is extended or adjusted under 35 U.S.C. 154(b) by 593 days.

(21) Appl. No.: 12/659,476

(22) Filed: Mar. 10, 2010

(65) Prior Publication Data
US 2010/0248005 A1 Sep. 30, 2010

(30) Foreign Application Priority Data
Mar. 30, 2009 (KR) .................. 10-2009-0027119

(51) Int. Cl.
*H01M 2/20* (2006.01)
(52) U.S. Cl.
CPC .................... *H01M 2/206* (2013.01)
(58) Field of Classification Search
CPC ...... H01M 2/202; H01M 2/204; H01M 2/206
USPC .......................... 429/158, 160, 161
See application file for complete search history.

(56) References Cited

U.S. PATENT DOCUMENTS

| 4,603,093 A * | 7/1986 | Edwards et al. ........ 429/54 |
| 5,558,960 A | 9/1996 | Mitchell |
| 5,709,966 A * | 1/1998 | Sawada et al. ........ 429/160 |
| 7,579,110 B2 | 8/2009 | Kim et al. |
| 7,964,302 B2 | 6/2011 | Ha et al. |
| 2006/0208698 A1* | 9/2006 | Maguire et al. ........ 320/116 |
| 2007/0141460 A1* | 6/2007 | You et al. ........ 429/185 |

FOREIGN PATENT DOCUMENTS

| JP | 2000-100418 A | 4/2000 |
| JP | 2002-100340 A | 4/2002 |
| JP | 2006-260875 A | 9/2006 |
| KR | 10 2004-0081327 A | 9/2004 |
| KR | 10 2006-0073385 A | 6/2006 |
| WO | WO 2006/068379 A1 | 6/2006 |

* cited by examiner

*Primary Examiner* — Ula C Ruddock
*Assistant Examiner* — Thomas Parsons
(74) *Attorney, Agent, or Firm* — Lee & Morse, P.C.

(57) ABSTRACT

A rechargeable battery module including at least two unit cells, each unit cell having a positive electrode terminal and a negative electrode terminal, each unit cell having a side surface disposed crosswise to one direction, the at least two unit cells overlapping at their side surfaces, a positive electrode terminal and a negative electrode terminal respectively, of different unit cells being coupled to each other and facing each other, and a conductive spacer interposed between the positive electrode terminal and the negative electrode terminal of the respective unit cells, and electrically connecting the positive electrode terminal and the negative electrode terminal to each other.

12 Claims, 10 Drawing Sheets

RECHARGEABLE BATTERY MODULE

BACKGROUND

1. Field

Embodiments relate to a rechargeable battery module.

2. Description of the Related Art

A large-capacity rechargeable battery may be used as a power supply for, e.g., driving a motor in an electric vehicle or a hybrid electric vehicle, etc. The large capacity rechargeable battery may include a plurality of rechargeable unit cells. The unit cells may be connected in series.

In the serial connection, a positive electrode terminal of one unit cell and a negative electrode terminal of an adjacent unit cell may be connected to each other by, e.g., a connection member. The positive electrode terminal of the adjacent unit cell and a negative electrode terminal of another adjacent unit cell may be connected through, e.g., another connection member.

The positive electrode terminal and the negative electrode terminal may be made of different materials. A side of the connection member made of one material may be welded to the positive electrode terminal, and another side of the connection member may be welded to the negative electrode terminal of the adjacent unit cell. Accordingly, the respective ends of the connection member may have different welding capacities. That is, one side of the connection member may have a lower welding capacity than the other side.

The above information disclosed in this Background section is only for enhancement of understanding of the background of the invention and does not necessarily constitute prior art or subject matter known in this country to a person of ordinary skill in the art.

SUMMARY

Embodiments are directed to a rechargeable battery module, which substantially overcomes one or more of the drawbacks, limitations and/or disadvantages of the related art.

It is a feature of an embodiment to provide a rechargeable battery having improved connection performance of a positive electrode terminal and a negative electrode terminal when the terminals are made of different materials.

At least one of the above and other features and advantages may be realized by providing a rechargeable battery module, including at least two unit cells, each unit cell having a positive electrode terminal and a negative electrode terminal, each unit cell having a side surface disposed crosswise to one direction, the at least two unit cells overlapping at their side surfaces, a positive electrode terminal and a negative electrode terminal, respectively, of different unit cells being coupled to each other and facing each other, and a conductive spacer interposed between the positive electrode terminal and the negative electrode terminal of the respective unit cells and electrically connecting the positive electrode terminal and the negative electrode terminal to each other.

The positive electrode terminal of the one unit cell and the negative electrode terminal of the adjacent unit cell may face each other in the one direction.

The positive electrode terminal and negative electrode terminal may have a plane surface parallel to a side surface of the unit cells, and the plane surfaces may face the one direction.

The positive electrode terminal may include at least one positive electrode through hole passing therethrough, and the negative electrode terminal may include at least one negative electrode through hole passing therethrough and corresponding to the positive electrode through hole.

The positive electrode terminal and the negative electrode terminal may be coupled to each other by a first member inserted in and passing sequentially through the positive electrode through hole and the negative electrode through hole and by a second member coupled to the first member.

The spacer may be a hollow cylinder with spacer ends with the first member passing therethrough, and the spacer ends may electrically connect to the plane surface of the positive electrode terminal and the facing plane surface of the negative electrode terminal.

The spacer and the first member may be coupled by screw threads.

The spacer may include a flange on each end of the cylinder through which flanges the first member passes, and the flanges may be electrically connected to one plane surface of the positive electrode terminal and to one plane surface of the negative electrode terminal that face each other.

The flanges may include a protrusion protruding toward the plane surface of the positive electrode terminal and the negative electrode terminal around the positive electrode through hole and the negative electrode through hole, respectively.

The spacer may be in the form of a clip elastically coupled to the first member, the clip having clip ends, and the spacer may electrically connect the clip ends to the plane surface of the positive electrode terminal and the plane surface of the negative electrode terminal.

The spacer may be in the form of one of a cylindrical pipe and a polygonal pipe with an opening in a lengthwise direction.

The spacer may have spacer ends, the positive electrode terminal may have a positive electrode groove at the plane surface thereof to receive at least a portion of one of the spacer ends, and the negative electrode terminal may have a negative electrode groove at the plane surface thereof facing the positive electrode groove to receive at least a portion of another of the spacer ends.

The positive electrode groove and the negative electrode groove may be in the form of one of an electrode groove circle and an electrode groove polygon, and the spacer may be in the form of one of a circular spacer cylinder or a spacer polygon corresponding to the form of one of the electrode groove circle and the electrode groove polygon.

The spacer ends may be wholly inserted in the positive electrode groove and the negative electrode groove.

The positive electrode terminal may have at least one positive electrode through hole passing therethrough in the one direction, the negative electrode terminal may have at least one negative electrode through hole passing therethrough in the one direction, the negative electrode through hole corresponding to the positive electrode through hole, and the positive electrode terminal and the negative electrode terminal may be coupled to each other by a first member inserted in and sequentially passing through the positive electrode through hole and the negative electrode through hole and by a second member coupled to the first member.

The positive electrode through hole may be spaced from the unit cell with respect to the positive electrode groove, and the negative electrode through hole may be spaced from the unit cell with respect to the negative electrode groove.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Korean Patent Application No. 10-2009-0027119, filed on Mar. 30, 2009, in the Korean Intellectual Property Office, and entitled: "Rechargeable Battery Module," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions may be exaggerated for clarity of illustration. It will also be understood that when an element is referred to as being "on" another element, it can be directly on the other element, or intervening elements may also be present. Like reference numerals refer to like elements throughout.

Figure 1:
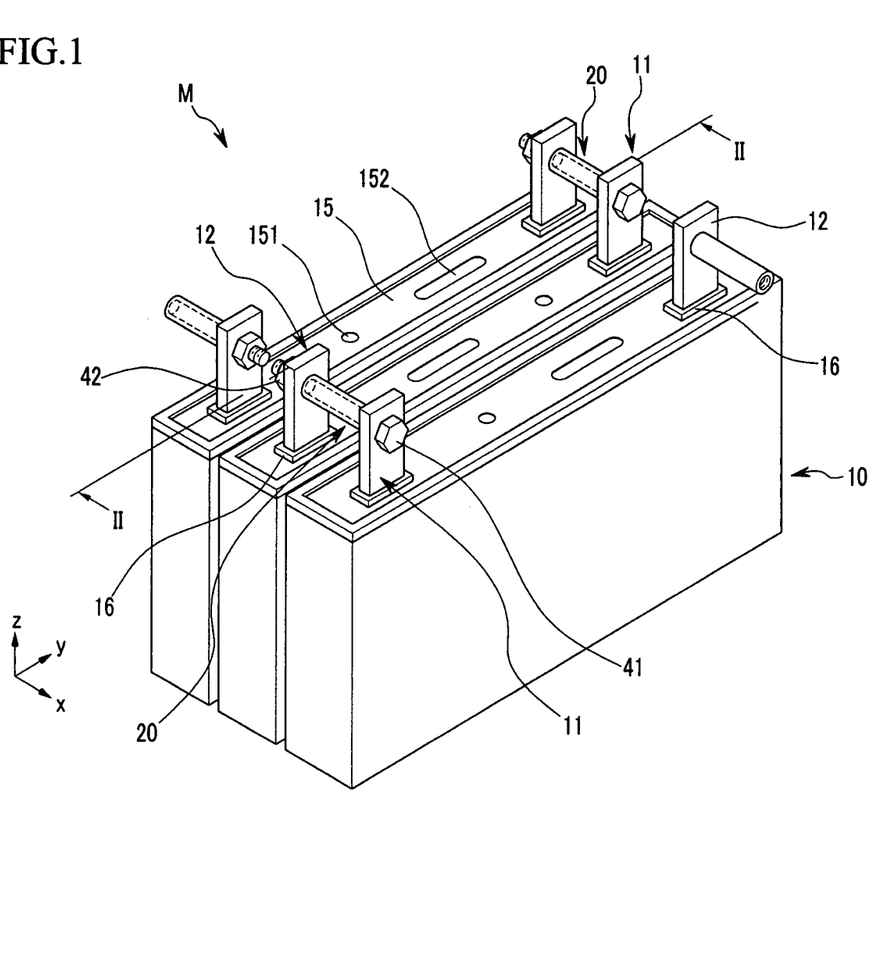
FIG. 1 illustrates a perspective view of a rechargeable battery module according to an embodiment.

FIG. 1 illustrates a perspective view of a rechargeable battery module according to an embodiment. Referring to FIG. 1, a rechargeable battery module M according to an embodiment may include at least two adjacent unit cells 10 disposed along a first direction. The rechargeable battery module M may include at least one conductive spacer 20 connecting the unit cells 10 in series.

For example, each unit cell 10 may have hexahedral shape having a wide side surface (yz plane surface) and a small side surface (xz plane surface). The wide side surfaces (yz plane surfaces) of the adjacent unit cells 10 may be disposed adjacent to each other. That is, in the rechargeable battery module M, the unit cells 10 may be sequentially disposed along a first direction (x-axis direction) crossing the side surface (yz plane surface). The wide side surfaces of the adjacent unit cells 10 may face each other.

The spacer 20 may be disposed between and couple a positive electrode terminal 11 and an opposing negative electrode terminal 12. That is, the positive electrode terminal 11 of one unit cell and the negative electrode terminal 12 of an adjacent unit cell 10 (hereinafter, "corresponding") may be connected in series, thereby forming the rechargeable battery module M to attain high power output. The output of the rechargeable battery module M may be determined according to the number of unit cells 10 connected in series.

In the rechargeable battery module M, the corresponding positive electrode terminal 11 and negative electrode terminal 12 may be electrically connected to each other by the conductive spacer 20. The coupling structure of the corresponding positive electrode terminal 11 and negative electrode terminal 12 may or may not be conductive.

Figure 2:
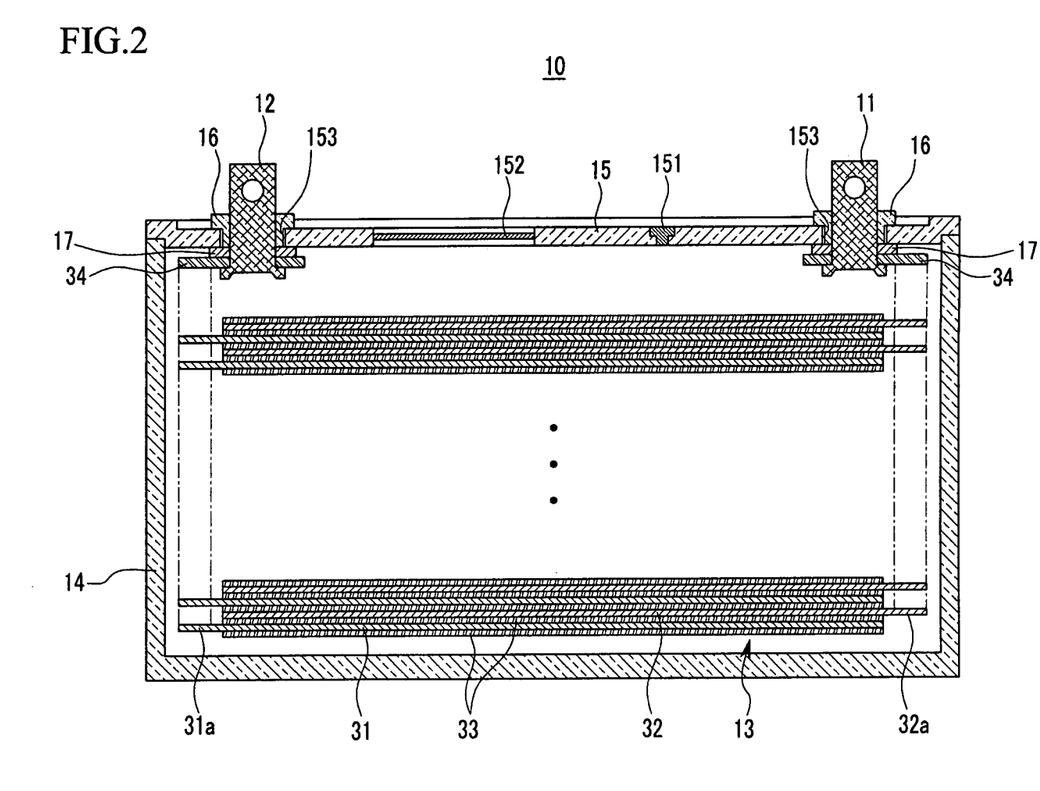
FIG. 2 illustrates a cross-sectional view of the rechargeable battery module of FIG. 1 taken along the line II-II thereof.

FIG. 2 illustrates a cross-sectional view of the rechargeable battery module of FIG. 1 taken along the line II-II thereof. Referring to FIG. 2, the unit cell 10 may form the rechargeable battery including the positive electrode terminal 11 and the negative electrode terminal 12.

Each unit cell 10 may include an electrode assembly 13 connected to the positive electrode terminal 11 and the negative electrode terminal 12, a case 14 housing the electrode assembly 13 and electrically connected to (not shown) the positive electrode terminal 11, a cap plate 15 covering an opening at an end of the case 14, an outer insulator 16 on an outside surface of the cap plate 15 and an inner insulator 17 on an inside surface of the cap plate 15. The electrode assembly 13 may have a jelly-roll shape formed by spiral-winding a positive electrode 31 and a negative electrode 32 with an insulating separator 33 interposed therebetween. The positive electrode 31 and the negative electrode 32 may each include a coated region including a current collector formed of a thin metal foil coated with an active material. The positive electrode 31 and the negative electrode 32 may each include uncoated portions 31a and 32a where the current collector is not coated with the active material.

The uncoated portions 31a and 32a may be disposed at ends of the positive electrode 31 and the negative electrode 32, respectively, and may be disposed at opposite sides of the unit cell 10. The uncoated regions 32a and 31a may respectively be connected to the positive electrode terminal 11 and the negative electrode terminal 12 through a current collecting member 34.

The case 14 may form the outer part of the unit cell 10. The case 14 may be made of a conductive metal, e.g., aluminum, an aluminum alloy or nickel-plated steel. The case 14 may include a space housing the electrode assembly 13, and may have, e.g., a rectangular shape of a hexahedron.

The cap plate 15 may be made of a thin plate material, and may close and seal the opening in the end of the case 14. The cap plate 15 may have an electrolyte injection opening (not shown) to inject an electrolyte solution into the closed and sealed case 14.

The electrolyte injection opening may be sealed by a sealing valve 151 after inserting the electrolyte solution. The cap plate 15 may have a vent portion 152 that breaks at a predetermined internal pressure to prevent, e.g., explosion of the unit cell 10.

The cap plate 15 may have a pair of terminal holes 153 corresponding to the positive electrode terminal 11 and the negative electrode terminal 12. The positive electrode terminal 11 and the negative electrode terminal 12 may be coupled to the corresponding terminal hole 153 with an insulating structure by interposing the outer insulator 16 and the inner insulator 17 between the electrode terminals 11 and 12 and their respective terminal holes 153. The positive electrode terminal 11 and negative electrode terminal 12 may be connected to the current collecting member 34 inside the case 14.

Accordingly, the positive electrode terminal 11 and the negative electrode terminal 12 may be electrically connected to the electrode assembly 13 through the current collecting members 34.

Figure 3:
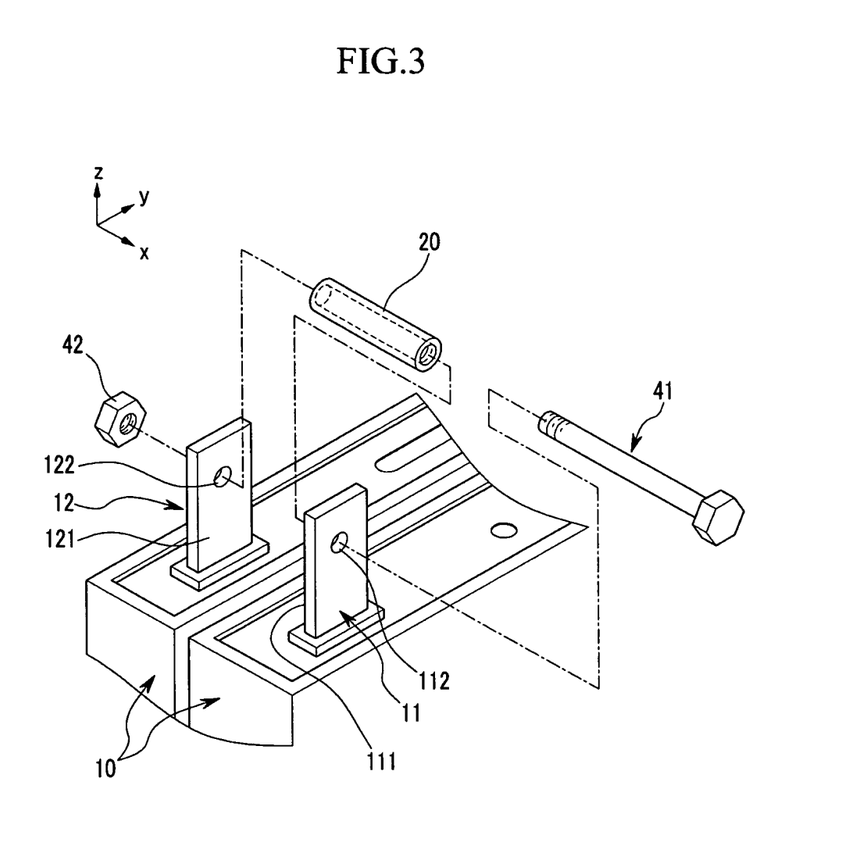
FIG. 3 illustrates an exploded perspective view of a spacer, first and second members and positive and negative electrode terminals according to a first embodiment.
Figure 4:
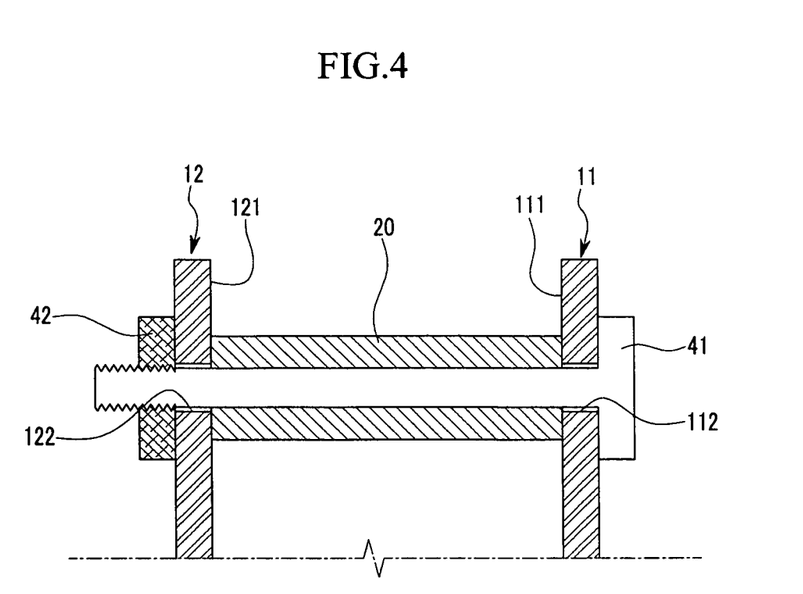
FIG. 4 illustrates a cross-sectional view of an assembly of FIG. 3.

FIG. 3 illustrates an exploded perspective view of a spacer 20, first and second members 41 and 42 and positive and negative electrode terminals 11 and 12 according to the first embodiment. FIG. 4 illustrates a cross-sectional view of the assembly of FIG. 3. Referring to FIG. 3 and FIG. 4, the positive electrode terminal 11 and the negative electrode terminal 12 in each unit cell 10 may protrude outside the cap plate 15 and face each other in the x-axis direction. Also, each electrode terminal 11 and 12 may have plane surfaces 111 and 121 parallel to the wide side surfaces (yz plane surface) of the unit cells 10. That is, the plane surface 111 of the positive electrode terminal 11 of one unit cell 10 and the plane surface 121 of the negative electrode terminal 12 of another unit cell 10 may face each other in a direction (x-axis direction) crosswise to the side surface (yz plane surface) of the unit cells 10.

The positive electrode terminal 11 and the negative electrode terminal 12 may form an electrical connection through the conductive spacer 20 disposed therebetween. The coupling structure coupling the corresponding positive electrode terminal 11 and the negative electrode terminal 12 may be variously formed. For example, the corresponding positive electrode terminal 11 and the negative electrode terminal 12 may respectively have a positive electrode through hole 112 and a negative electrode through hole 122 passing therethrough in the x-axis direction for effecting coupling. The positive electrode through hole 112 and the negative electrode through hole 122 may face each other, thereby simplifying the coupling process as detailed below.

The first member 41 may be inserted into and pass through the positive electrode through hole 112 and the negative electrode through hole 122 to be combined with the second member 42. As a result, the corresponding positive electrode terminal 11 and the negative electrode terminal 12 may be coupled while facing each other. For example, the first and second members 41 and 42 may include a bolt and a nut. Alternatively, although not shown, the first and second members 41 and 42 may be made of various coupling elements. The spacer 20 may be in the form of a hollow cylinder, and respective ends of the cylinder may contact the plane surface 111 of the positive electrode terminal 11 of the one unit cell 10 and the plane surface 121 of the negative electrode terminal 12 of the adjacent unit cell 10 for the electrical connection.

The first member 41 may pass through the positive and negative electrodes through holes 112 and 122, and the spacer 20 therebetween, and then may be coupled to the second member 42. The first member 41 and the spacer 20 may have an inserting tolerance therebetween. Therefore, an electrical connection may or may not occur between the first member 41 and the spacer 20, and accordingly any electrical connection between the first member 41 and the spacer 20 may be ignored in the first embodiment.

Yet, due to the coupling force exerted by the first and second members 41 and 42, the ends of the spacer 20 may be electrically connected to the plane surfaces 111 and 121 of the corresponding positive and negative electrode terminals 11 and 12. When the first and second members 41 and 42 are formed of a conductive material, the electrical connection performance of the corresponding positive and the negative electrode terminals 11 and 12 may be further improved.

The coupling force of the first and second members 41 and 42 may be exerted equally at both ends of the spacer 20. Accordingly, electrical connection performance of the same degree may occur on the respective sides of the corresponding positive and negative electrode terminals 11 and 12 even when the corresponding positive and negative electrode terminals 11 and 12 are made of different materials.

Hereafter, various other embodiments will be described. Repeated descriptions of components that are identical or similar to the first embodiment will be omitted, and different components will be described.

Figure 5A:
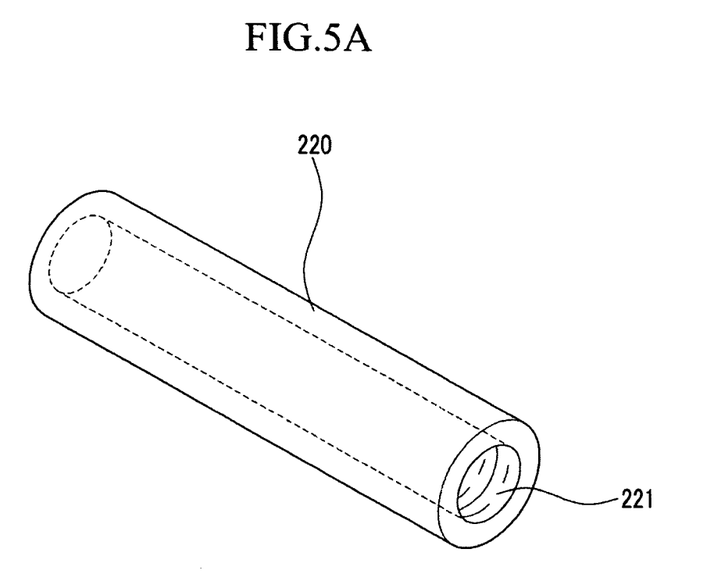
FIG. 5A illustrates a perspective view of a spacer of a second embodiment.
Figure 5B:
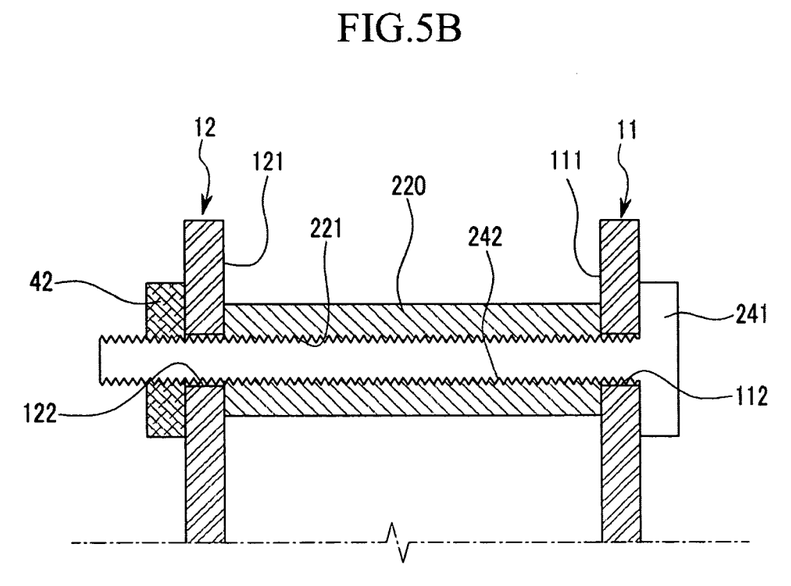
FIG. 5B illustrates a cross-sectional view of a terminal connection using the spacer of the second embodiment.

FIG. 5A illustrates a perspective view of a spacer of a second embodiment. FIG. 5B illustrates a cross-sectional view of a terminal connection using the spacer of the second embodiment. Referring to FIG. 5A and FIG. 5B, a spacer 220 according to the second embodiment may be in the form of a hollow cylinder. A first screw thread 221 may be disposed on an inner surface of the spacer 220. The screw thread 221 may be coupled to a second screw thread 242 of a first member 241.

When the first and second members 241 and 42 are made of a conductive material, they may electrically connect the corresponding positive and negative electrode terminals 11 and 12. In addition, an electrical connection due to the connection structure of the first member 241 and the spacer 220 may also occur.

Figure 6A:
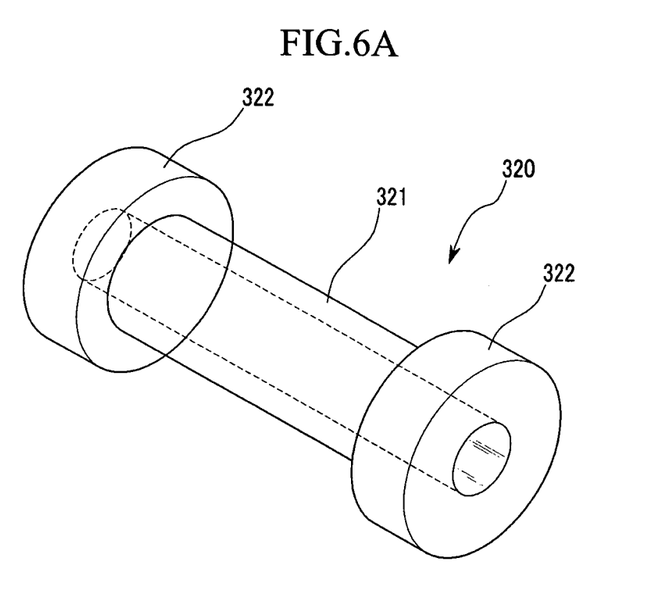
FIG. 6A illustrates a perspective view of a spacer of a third embodiment.
Figure 6B:
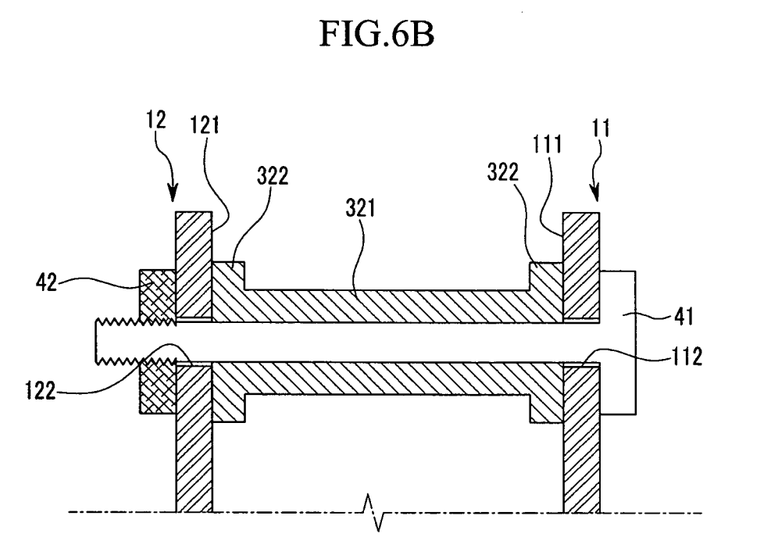
FIG. 6B illustrates a cross-sectional view of a terminal connection using the spacer of the third embodiment.

FIG. 6A illustrates a perspective view showing a spacer according to the third embodiment. FIG. 6B illustrates a cross-sectional view of a terminal connection using the spacer of the third embodiment. Referring to FIG. 6A and FIG. 6B, a spacer 320 according to the third embodiment may further includes flanges 322 disposed at respective ends of a cylinder 321.

The first member 41 may pass through the positive electrode terminal 11 of the one unit cell 10, one flange 322, the cylinder 321, the other flange 322 and the negative electrode terminal 12 of the adjacent unit cell 10. The first member 41 may be connected to the second member 42 such that the corresponding positive electrode terminal 11 and the negative electrode terminal 12 may be coupled while facing each other. The flanges 322 may connect the spacer 320 to the plane surface 111 of the positive electrode terminal 11 of the one unit cell and the plane surface 121 of the negative electrode terminal 12 of the adjacent unit cell over a large area. Accordingly, the corresponding positive and negative electrode terminals 11 and 12 may be electrically connected to each other.

In the third embodiment, the flanges 322 and the plane surfaces 111 and 121 may be connected such that a connection area may correspond to the surface area of the flange 322. As a result, electrical connection performance between the negative electrode terminals 11 and 12 may be improved.

Figure 7A:
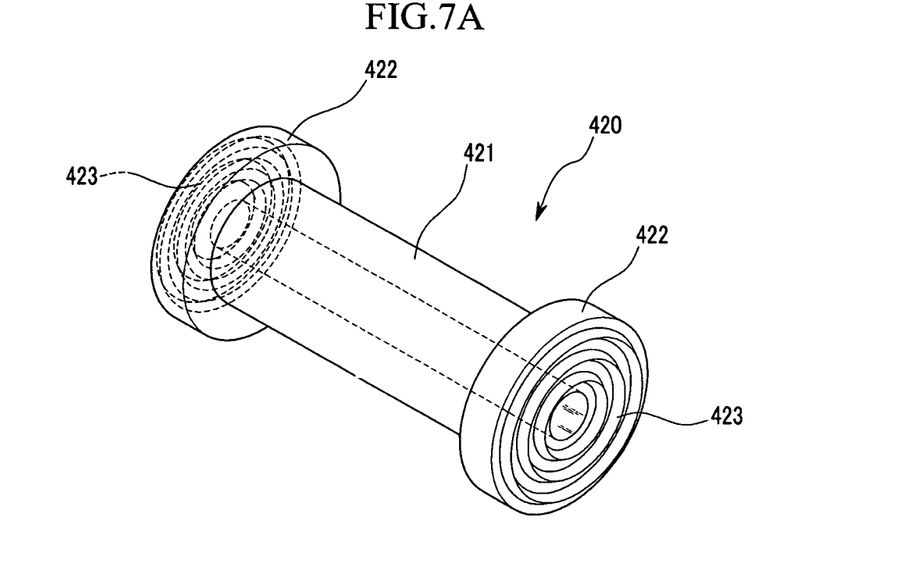
FIG. 7A illustrates a perspective view of a spacer of a fourth embodiment.
Figure 7B:
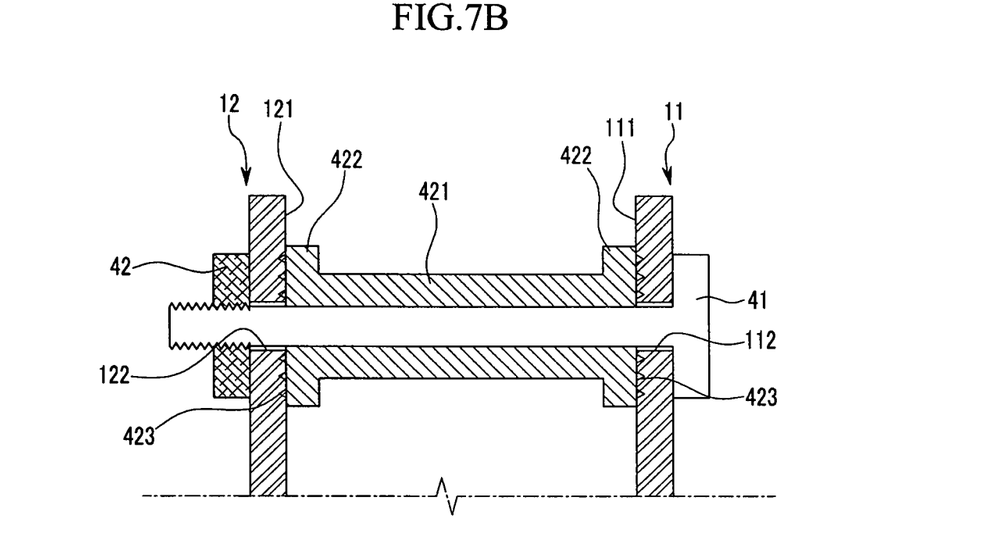
FIG. 7B illustrates a cross-sectional view of a terminal connection using the spacer of the fourth embodiment.

FIG. 7A illustrates a perspective view showing a spacer according to a fourth embodiment. FIG. 7B illustrates a cross-sectional view of a terminal connection using the spacer of the fourth embodiment. Referring to FIG. 7A and FIG. 7B, a spacer 420 according to the fourth embodiment may further include protrusions 423 and flanges 422.

The protrusions 423 may protrude from the flanges 422 toward the plane surfaces 111 and 121 of the corresponding positive electrode terminal 11 and the negative electrode terminal 12. The protrusions 423 may contact the plane surface 111 adjacent to the positive electrode through hole 112 and the plane surface 121 adjacent to the negative electrode through hole 122. As shown, the protrusions 423 may have, e.g., a concentric circular shape on the flange 422.

When the coupling force of the first and second members 41 and 42 is applied, the protrusions 423 may be deformed between the flanges 422 and the corresponding positive and the negative electrode terminal 11 and 12, thereby forming a connection structure. That is, the protrusions 423 may form the connection structure even if a gap is present at a side of the flanges 422 if, e.g., the corresponding positive and negative electrode terminals 11 and 12 do not contact the flanges 422 in parallel.

In the fourth embodiment, the flanges 422 and the protrusions 423 may be coupled to the plane surfaces 111 and 121 of the corresponding positive and negative electrode terminals 11 and 12 such that connection reliability and electrical connection performance of the corresponding positive and negative electrode terminals 11 and 12 may be improved.

Figure 8A:
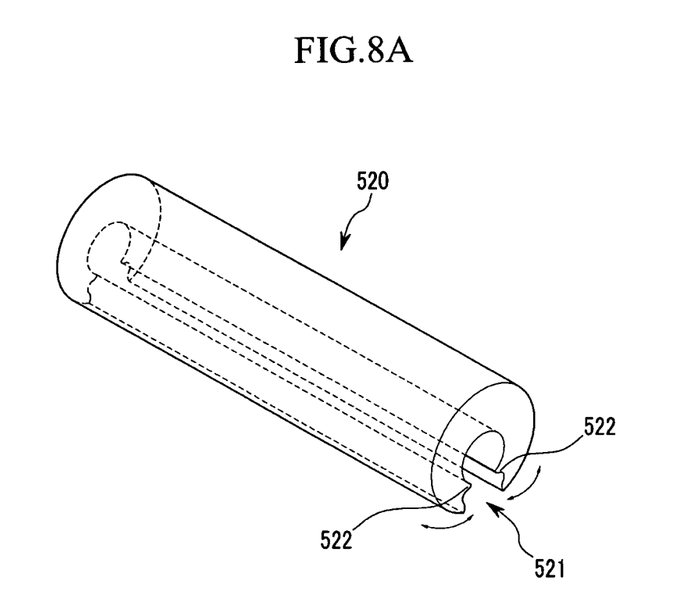
FIG. 8A illustrates a perspective view of a spacer of a fifth embodiment.
Figure 8B:
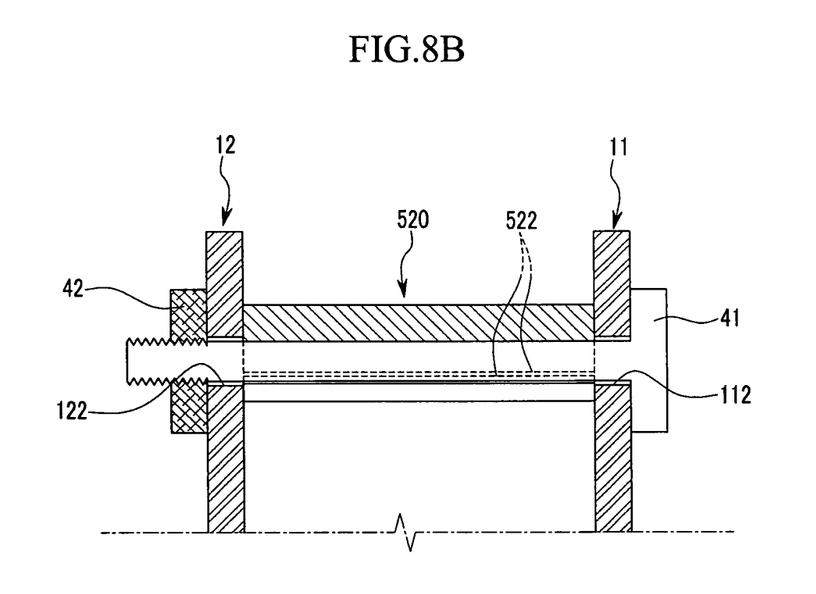
FIG. 8B illustrates a cross-sectional view of a terminal connection using the spacer of the fifth embodiment.

FIG. 8A illustrates a perspective view showing a spacer of a fifth embodiment. FIG. 8B illustrates a cross-sectional view of a terminal connection using the spacer of the fifth embodiment. Referring to FIG. 8A and FIG. 8B, a spacer 520 according to the fifth embodiment may be in the form of a clip.

The spacer 520 may be elastically connected to the first member 41 coupling the corresponding positive and negative electrode terminals 11 and 12. Ends of the spacer 520 may be electrically connected to the plane surfaces 111 and 121 of the corresponding positive and negative electrode terminals 11 and 12.

For the clip-type spacer 520 to have elasticity, an opening 521 may be disposed at an outer side thereof along a lengthwise direction. Forming the opening 521 may decrease the electrical connection area of the spacer 520, however, the electrical connection area may be recovered by increasing a cross-section of the spacer 520.

The spacer 520 may be inserted onto the first member 41 while the first member 41 is inserted into the corresponding positive and negative electrode through holes 112 and 122. This may allow for easy connection and mounting of the spacer 520 to the first member 41.

Also, the spacer 520 may have a hooking protrusion 522 inside sides of the opening 521 to keep the spacer 520 coupled to the first member 41. When coupling the spacer 520 to the first member 41, the area between the hooking protrusions 522 may be widened to allow the spacer 520 to fit over the first member 41. After coupling, the hooking protrusions 522 may return to their original positions to maintain the connection state.

Figure 9:
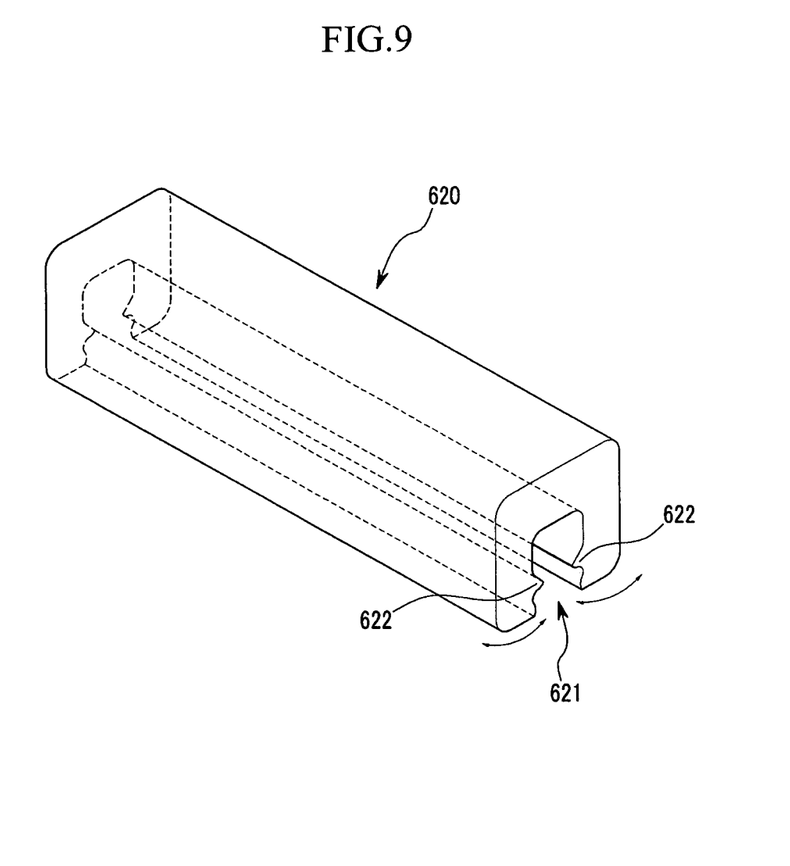
FIG. 9 illustrates a perspective view of a spacer of a sixth embodiment.

FIG. 9 illustrates a perspective view showing a spacer according to the sixth embodiment. Referring to FIG. 9, a spacer 620 according to the sixth embodiment may be in the form of, e.g., a polygonal pipe including an opening 621 disposed along the outside of the polygonal pipe in a lengthwise direction. For example, the opening 621 may be disposed in a face of a square pipe. Hooking protrusions 622 may be disposed along the lengthwise direction inside the opening 621. The structure and function of the hooking protrusions 622 and opening 621 may be similar to the hooking protrusions 522 and opening 521 of the spacer 520 according to the fifth embodiment.

In the first to sixth embodiments, the spacers 20, 220, 320, 420, 520, and 620 may be coupled the first member 41 (or 241) to electrically connect the corresponding positive and negative electrode terminals 11 and 12 to each other. In the seventh embodiment, however, the spacer 720 may be independently installed with respect to the first member 41 in order to electrically connect the corresponding positive and negative electrode terminals 11 and 12 (referring to FIG. 10).

Figure 10:
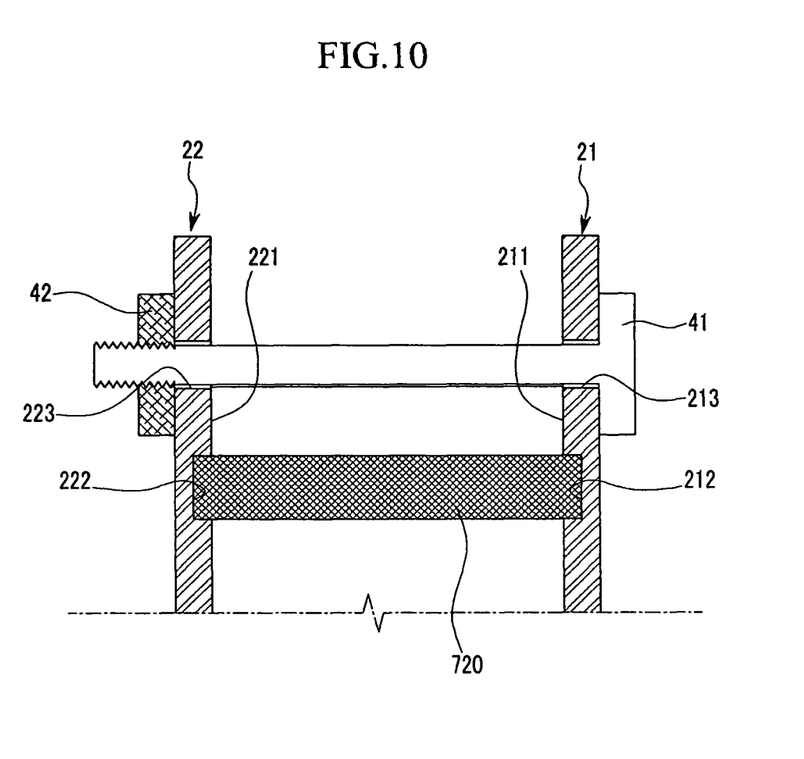
FIG. 10 illustrates a cross-sectional view of a spacer of a seventh embodiment.

FIG. 10 illustrates a cross-sectional view showing a spacer according to the seventh embodiment. Referring to FIG. 10, in the seventh embodiment, the process of connecting the positive and negative electrode terminals 21 and 22 may be difficult compared to the previous embodiments, however, the electrical connection performance of the positive and negative electrode terminals 21 and 22 may be improved.

Corresponding positive and negative electrode terminals 21 and 22 may respectively have positive and negative electrode grooves 212 and 222 in facing plane surfaces 211 and 221. The positive and negative electrodes grooves 212 and 222 may receive at least a portion of ends of a spacer 720.

The positive and negative electrode grooves 212 and 222 may correspond to a cross-sectional shape of insertion portions of the spacer 720. Ends of the spacer 720 may be inserted therein. The positive and negative electrode grooves 212 and 222 may be, e.g., circular or polygonal. The spacer 720 may be in the form of, e.g., a circular cylinder or a polygonal cylinder corresponding to the positive and negative electrode grooves 212 and 222. The spacer 720 of the seventh embodiment may have a hollow structure like the first to sixth embodiments, however, because of the reduced connection area, this may lower electrical connection performance.

The positive and negative electrode grooves 212 and 222 may receive the ends of the spacer 720 such that the contact area of the corresponding positive and negative electrode terminals 21 and 22 and the spacer 720 may be stereoscopically formed and increased. Accordingly, the electrical connection performance may be largely improved.

Each of the corresponding positive and negative electrode terminals 21 and 22 may have at least one positive electrode through hole 213 or 223 passing therethrough and facing each other. The first member 41 may be inserted through the positive and negative electrodes through holes 213 and 223. The first member 41 may be coupled to the second member 42. Due to the coupling force exerted by the first and second members 41 and 42, the spacer 720 and the positive and negative electrode grooves 212 and 222 may form and maintain an electrical connection structure.

To securely maintain the connection structure, the positive and negative electrode through holes 213 and 223 may be disposed above the positive and negative electrode grooves 212 and 222. That is, the positive and negative electrode grooves 212 and 222 and the spacer 720 may receive the coupling force exerted by the first and second members 41 and 42 in the positive and negative electrode terminals 11 and 12, and may receive a fixed force from the cap plate 15 below the spacer 720.

According to embodiments as disclosed herein, the positive electrode terminal and the negative electrode terminal of the neighboring unit cells may be coupled to each other, and the conductive spacer may be interposed between the positive electrode terminal and the negative electrode terminal that are made of different materials to electrically connect the positive electrode terminal and the negative electrode terminal to each other while improving the electrical connection performance thereof. The same coupling force may operate at both ends of the spacer such that connection performance of the same degree may be formed in the connection between one end of the spacer and the positive electrode terminal, and the other end of the spacer and the negative electrode terminal.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:
1. A rechargeable battery module, comprising:
at least two unit cells, each unit cell having a positive electrode terminal and a negative electrode terminal, each unit cell having a side surface disposed crosswise to one direction, the at least two unit cells overlapping at their side surfaces;

a positive electrode terminal and a negative electrode terminal, respectively, of different unit cells being coupled to each other and facing each other; and a conductive spacer interposed between the positive electrode terminal and the negative electrode terminal of the respective unit cells and electrically connecting the positive electrode terminal and the negative electrode terminal to each other, wherein:

the conductive spacer has a hollow cylindrical shape such that the conductive spacer has an outer circumferential surface and the outer circumferential surface of the conductive spacer is concentric with a circumferential surface of a hole in the spacer, the spacer includes a flange on each end thereof, the flanges are electrically connected to one plane surface of the positive electrode terminal and to one plane surface of the negative electrode terminal that face each other, the flanges include concentric protrusions protruding toward plane surfaces of the positive electrode terminal and the negative electrode terminal, and the protrusions extend in a continuous manner around the positive electrode through hole and the negative electrode through hole, respectively.

2. The rechargeable battery module as claimed in claim 1, wherein the positive electrode terminal of the one unit cell and the negative electrode terminal of the adjacent unit cell face each other in the one direction.

3. The rechargeable battery module as claimed in claim 1, wherein the one plane surface of the positive electrode terminal and the one plane surface of the negative electrode terminal are parallel to a side surface of the unit cells, and the plane surfaces face the one direction.

4. The rechargeable battery module as claimed in claim 3, wherein:

the positive electrode terminal includes at least one positive electrode through hole passing therethrough, and the negative electrode terminal includes at least one negative electrode through hole passing therethrough and corresponding to the positive electrode through hole.

5. The rechargeable battery module as claimed in claim 4, wherein the positive electrode terminal and the negative electrode terminal are coupled to each other by a first member inserted in and passing sequentially through the positive electrode through hole and the negative electrode through hole and by a second member coupled to the first member.

6. The rechargeable battery module as claimed in claim 5, wherein:

the spacer is a hollow cylindrical spacer having spacer ends, and the first member passes through the hollow cylindrical spacer.

7. The rechargeable battery module as claimed in claim 6, wherein the spacer and the first member are coupled by screw threads.

8. The rechargeable battery module as claimed in claim 6, wherein:

the first member passes through the flanges.

9. A rechargeable battery module comprising:

at least two unit cells, each unit cell having a positive electrode terminal and a negative electrode terminal, each unit cell having a side surface disposed crosswise to one direction, the at least two unit cells overlapping at their side surfaces;

a positive electrode terminal and a negative electrode terminal, respectively, of different unit cells being coupled to each other and facing each other; and a conductive spacer interposed between the positive electrode terminal and the negative electrode terminal of the respective unit cells and electrically connecting the positive electrode terminal and the negative electrode terminal to each other, wherein:

the positive electrode terminal and negative electrode terminal have a plane surface parallel to a side surface of the unit cells, the plane surfaces face the one direction, the spacer has spacer ends, the positive electrode terminal has a positive electrode groove at the plane surface thereof to receive at least a portion of one of the spacer ends, the negative electrode terminal has a negative electrode groove at the plane surface thereof facing the positive electrode groove to receive at least a portion of another of the spacer ends, the positive electrode terminal has at least one positive electrode through hole passing therethrough in the one direction, the negative electrode terminal has at least one negative electrode through hole passing therethrough in the one direction, the negative electrode through hole corresponding to the positive electrode through hole, the positive electrode terminal and the negative electrode terminal are coupled to each other by a first member inserted in and sequentially passing through the positive electrode through hole and the negative electrode through hole and by a second member coupled to the first member, the positive electrode through hole is distally arranged on the positive electrode terminal with respect to the positive electrode groove such that the positive electrode groove is between the positive electrode through hole and a cap plate of the unit cell, and the negative electrode through hole is distally arranged on the negative electrode terminal with respect to the negative electrode groove such that the negative electrode groove is between the negative electrode through hole and the cap plate of the unit cell.

10. The rechargeable battery module as claimed in claim 9, wherein:

the positive electrode groove and the negative electrode groove are in the form of one of an electrode groove circle and an electrode groove polygon, and the spacer is in the form of one of a circular spacer cylinder or a spacer polygon corresponding to the form of one of the electrode groove circle and the electrode groove polygon.

11. The rechargeable battery module as claimed in claim 9, wherein the spacer ends are wholly inserted in the positive electrode groove and the negative electrode groove.

12. The rechargeable battery module as claimed in claim 9, wherein the positive electrode groove and the negative electrode groove each surround an end of the spacer and portions of sides of the spacer, the sides of the spacer being orthogonal to the plane surfaces of the positive and negative electrode terminals.

* * * * *